United States Patent
Crear et al.

(10) Patent No.: US 10,112,260 B2
(45) Date of Patent: Oct. 30, 2018

(54) ALIGNING LASERS OF LASER ADDITIVE MANUFACTURING SYSTEM

(71) Applicant: General Electric Company, Schenectady, NY (US)

(72) Inventors: Donnell Eugene Crear, Simpsonville, SC (US); David Edward Schick, Greenville, SC (US); Archie Lee Swanner, Jr., Easley, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/001,607

(22) Filed: Jan. 20, 2016

(65) Prior Publication Data

US 2017/0203517 A1    Jul. 20, 2017

(51) Int. Cl.
*B23K 26/12*        (2014.01)
*B22F 3/105*        (2006.01)
(Continued)

(52) U.S. Cl.
CPC .......... *B23K 26/125* (2013.01); *B22F 3/1055* (2013.01); *B23K 26/032* (2013.01);
(Continued)

(58) Field of Classification Search
CPC ............ B29C 67/0088; B29C 67/0077; B29C 67/0066; B29C 67/670051;
(Continued)

(56) References Cited

U.S. PATENT DOCUMENTS 5,430,666 A * 7/1995 DeAngelis .......... B29C 67/0077
                                                              250/491.1
5,536,467 A   7/1996 Reichle et al.
(Continued)

FOREIGN PATENT DOCUMENTS

EP         2875897 B1    1/2016
WO     2015040185 A1    3/2015

OTHER PUBLICATIONS

Extended European Search Report and Opinion issued in connection with corresponding EP Application No. 17151900.2 dated Jul. 10, 2017.

(Continued)

*Primary Examiner* — Seyed Masoud Malekzadeh
*Assistant Examiner* — Sonny V Nguyen
(74) *Attorney, Agent, or Firm* — Ernest G. Cusick; Hoffman Warnick LLC

(57) ABSTRACT

Methods for aligning a pair of calibrated lasers of a laser additive manufacturing system in an overlap region in which the pair of calibrated lasers selectively operate are provided. Respective first and second plurality of layers of a test structure are formed in the overlap region of the pair of calibrated lasers solely using a first calibrated laser of the pair of calibrated lasers and then solely using a second calibrated laser of the pair of calibrated lasers. The test structure forming creates an outer surface of the test structure corresponding to the overlap region. A dimension(s) of an offset step(s) created between the first plurality of layers and the second plurality of layers in the outer surface of the test structure is/are measured. The lasers are aligned by applying the dimension(s) of the offset step(s) as an alignment correction(s) to at least one of the pair of calibrated lasers.

20 Claims, 10 Drawing Sheets

(51) Int. Cl.
  *B23K 26/03*  (2006.01)
  *B23K 26/06*  (2014.01)
  *B23K 26/342*  (2014.01)
  *B23K 26/082*  (2014.01)
  *B23K 26/042*  (2014.01)
  *B29C 64/386*  (2017.01)
  *B33Y 10/00*  (2015.01)
  *B23K 103/18*  (2006.01)

(52) U.S. Cl.
  CPC ........ *B23K 26/042* (2015.10); *B23K 26/0608* (2013.01); *B23K 26/082* (2015.10); *B23K 26/127* (2013.01); *B23K 26/342* (2015.10); *B29C 64/386* (2017.08); *B22F 2999/00* (2013.01); *B23K 2203/26* (2015.10); *B33Y 10/00* (2014.12); *Y02P 10/295* (2015.11)

(58) Field of Classification Search
  CPC . B29C 67/0081; B29C 64/386; B29C 64/393; B29C 64/188; B33Y 10/00; B33Y 50/02; B33Y 50/00; B22F 3/1055; B22F 2003/1057; B22F 7/00
  See application file for complete search history.

(56) References Cited

U.S. PATENT DOCUMENTS

| | | | | |
|---|---|---|---|---|
| 5,985,204 | A | 11/1999 | Otsuka et al. | |
| 2001/0003004 | A1* | 6/2001 | Leyden | B29C 41/12 425/375 |
| 2001/0051395 | A1* | 12/2001 | Grigg | B33Y 80/00 438/107 |
| 2009/0060386 | A1* | 3/2009 | Cooper | B23K 33/00 382/294 |
| 2010/0125356 | A1* | 5/2010 | Shkolnik | B29C 67/0088 700/98 |
| 2010/0174392 | A1* | 7/2010 | Fink | B29C 67/0077 700/104 |
| 2011/0220621 | A1 | 9/2011 | Pieger et al. | |
| 2014/0255666 | A1* | 9/2014 | Stucker | B29C 67/0081 428/201 |
| 2014/0348692 | A1 | 11/2014 | Bessac et al. | |
| 2015/0004045 | A1 | 1/2015 | Ljungblad | |
| 2016/0082668 | A1* | 3/2016 | Perret | B29C 67/0077 264/406 |
| 2016/0114432 | A1 | 4/2016 | Ferrar et al. | |

OTHER PUBLICATIONS

EOS M 400—3D Printing of Metal Parts on an Industrial Scale, EOS M 400 for Additive Manufacturing for the Industrial Production of High-Quality Large Metal Parts.—EOS. N.p., n.d. Web. Mar. 29, 2017. <https://www.eos.info/systems_solutions/metal/systems_equipment/eos_m_400>.

SLM 280 Metal Additive Manufacturing System, Multiple Lasers for Demanding Applications Ideal for Volume Production and Large Prototype Applications—SLM Solutions, N.p., n.d. Web. Mar. 29, 2017. <http://slm-solutions.us/slm-280hl/>.

SLM 500 Selective Laser Melting System Highlights, Up to 2800W Laser Power for Demanding Applications Additive Manufacturing with up to Four Lasers for High-Volume Production,—SLM Solutions, N.p., n.d. Web. Mar. 29, 2017. <http://slm-solutions.us/slm-500hl/>.

* cited by examiner ated lasers selectively operate, the method comprising: first forming a first plurality of layers of a test structure in the overlap region of the pair of calibrated lasers solely using a first calibrated laser of the pair of calibrated lasers;

ALIGNING LASERS OF LASER ADDITIVE MANUFACTURING SYSTEM

BACKGROUND OF THE INVENTION

The disclosure relates generally to additive manufacturing, and more particularly, to methods for aligning calibrated lasers in a multiple laser, metal additive manufacturing system.

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, e.g., 18-102 micrometers thick, and creating a file with a two-dimensional image of each layer. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed to create the object.

In metal powder additive manufacturing techniques, such as selective laser melting (SLM) and direct metal laser melting (DMLM), metal powder layers are sequentially melted together to form the object. More specifically, fine metal powder layers are sequentially melted after being uniformly distributed using an applicator on a metal powder bed. The metal powder bed can be moved in a vertical axis. The process takes place in a processing chamber having a precisely controlled atmosphere of inert gas, e.g., argon or nitrogen. Once each layer is created, each two dimensional slice of the object geometry can be fused by selectively melting the metal powder. The melting may be performed by a high powered laser such as a 100 Watt ytterbium laser to fully weld (melt) the metal powder to form a solid metal. The laser moves in the X-Y direction using scanning mirrors, and has an intensity sufficient to fully weld (melt) the metal powder to form a solid metal. The metal powder bed is lowered for each subsequent two dimensional layer, and the process repeats until the object is completely formed.

In order to create certain larger objects faster, some metal additive manufacturing systems employ a pair of high powered lasers that work together to form an object. Typically, each laser is individually calibrated so a known offset correction can be applied for each laser, allowing the precise location of the operational field of each laser to be known. In these type machines, as shown in the schematic plan view of FIG. 1, each laser has a field 10, 12 upon which it can create a melt pool on the metal powder on a build platform. The field indicates the entire area upon with any particular laser can work; the laser works within only a small portion of the field at any given time. An overlap region 14 of fields 10, 12 indicates an area in which laser fields 10, 12 intersect or overlap, i.e., both lasers can create a melt pool in that area. Where an outer surface of an object to be created falls within the overlap region, in order to create a smooth outer surface, the lasers must be aligned within the overlap region. That is, the lasers cannot just be individually calibrated, but must be aligned so they work together to create an aligned melt pool in the overlap region. As shown in the enlarged, schematic side view of FIG. 2, layers created by unaligned lasers 16 and 18 create an outer surface 20 of an object 22 in overlap region 14 that is unsmooth or bumpy.

One approach to identify and correct misaligned lasers employs, as shown in the plan view of FIG. 3, a fine tuning scan test using a foil 24 in the location of the build platform having a pair of perpendicular gradations 26, 28 with fine tick marks thereon. The lasers are applied at low power to each gradation and the amount of X and Y mis-alignment is measured. Any alignment correction(s) required is/are applied to the optics of one of the lasers to make the pair of lasers align. This technique however frequently does not correct the mis-alignment sufficiently to create objects with acceptable outer surface smoothness in the overlap region. This technique is inaccurate for a number of reasons. First, the conventional alignment test applies the lasers at low power rather than at the typically higher, operational power that the lasers will be used. Second, the conventional alignment test occurs in a two-dimensional space without consideration of the three-dimensional nature of the actual melt pool. Third, the conventional alignment test employs the relatively imprecise tick marks of the pair of perpendicular gradations, making an accurate alignment correction very difficult to obtain. Finally, the conventional alignment test also does not take into consideration the material that will be used to create the object, and its impact on the melt pool. In order to address the causes of the alignment inaccuracies, conventional laser additive manufacturing systems may also apply an alignment correction randomization in their control software, but this approach is typically ineffective because it only masks the misalignment as opposed to actually correcting for it. Alignment correction randomization works within the laser overlap region (region where multiple lasers can work on the same part on any given layer) by randomizing where each laser starts and stops within the overlapping area preventing the visualization of a single discrete starting and stopping point for each laser along the vertical (Z) axis of the part.

BRIEF DESCRIPTION OF THE INVENTION

A first aspect of the disclosure provides a method for aligning a pair of calibrated lasers of a laser additive manufacturing system in an overlap region in which the pair of calibrated lasers selectively operate, the method comprising: first forming a first plurality of layers of a test structure in the overlap region of the pair of calibrated lasers solely using a first calibrated laser of the pair of calibrated lasers; second forming a second plurality of layers of the test structure in the overlap region of the pair of calibrated lasers solely using a second calibrated laser of the pair of calibrated lasers, the first and second forming creating an outer surface of the test structure corresponding to the overlap region; measuring a dimension of an offset step created between the first plurality of layers and the second plurality of lasers in the outer surface of the test structure; and aligning the pair of calibrated lasers by applying the dimension of the offset step as an alignment correction to at least one of the pair of calibrated lasers.

A second aspect of the disclosure provides a method for aligning a pair of calibrated lasers of a laser additive manufacturing system in an overlap region in which the pair of calibrated lasers selectively operate, the method comprising: first forming a first plurality of layers of a test structure in the overlap region of the pair of calibrated lasers solely using a first calibrated laser of the pair of calibrated lasers;

second forming a second plurality of layers of the test structure in the overlap region of the pair of calibrated lasers solely using a second calibrated laser of the pair of calibrated lasers, the first and second forming creating an outer surface of the test structure corresponding to the overlap region, wherein the first and second forming include employing a laser power for each of the first and second calibrated lasers substantially equal to a laser power at which each calibrated laser operates to create an object using the laser additive manufacturing system; measuring a dimension of an offset step created between the first plurality of layers and the second plurality of lasers in the outer surface of the test structure; and aligning the pair of calibrated lasers by applying the dimension of the offset step as an alignment correction to a selected one of the pair of calibrated lasers.

A third aspect of the disclosure provides a method for aligning a pair of calibrated lasers of a laser additive manufacturing system in an overlap region in which the pair of calibrated lasers selectively operate, the method comprising: first forming a first plurality of layers of a test structure in the overlap region of the pair of calibrated lasers solely using a first calibrated laser of the pair of calibrated lasers; second forming a second plurality of layers of the test structure in the overlap region of the pair of calibrated lasers solely using a second calibrated laser of the pair of calibrated lasers, the first and second forming creating an outer surface of the test structure corresponding to the overlap region, wherein the first and second forming include employing a laser power for each of the first and second calibrated lasers substantially equal to a laser power at which each calibrated laser operates to create an object using the laser additive manufacturing system; measuring an X-direction dimension of an X-direction offset step created between the first plurality of layers and the second plurality of lasers in the outer surface of the test structure; measuring a Y-direction dimension of an Y-direction offset step created between the first plurality of layers and the second plurality of lasers in the outer surface of the test structure; and aligning the pair of calibrated lasers by applying the X-direction dimension of the X-direction offset step as a first alignment correction to a selected one of the pair of calibrated lasers and applying the Y-direction dimension of the Y-direction offset step as a second alignment correction to the selected one of the pair of calibrated lasers.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides methods for aligning lasers of a laser, metal powder additive manufacturing system. The method generates a test structure at or near full operational power of the lasers and in three-dimensions, thus making the test structure more accurately representative of an actual melt pool created by the lasers. The test structure is formed in the overlap region of the two lasers and includes two pluralities/groups of layers, each formed exclusively by one of the lasers. Since each laser forms a respective plurality of layers of the test structure, a dimension of an offset step in the X-direction and/or the Y-direction between the two plurality of layers indicates an amount of misalignment. The dimension(s) of the offset step(s) can be measured to accurately determine the misalignment, and the dimension(s) of the offset step(s) can be applied to the system as an alignment correction(s) to align the lasers.

Figure 4:
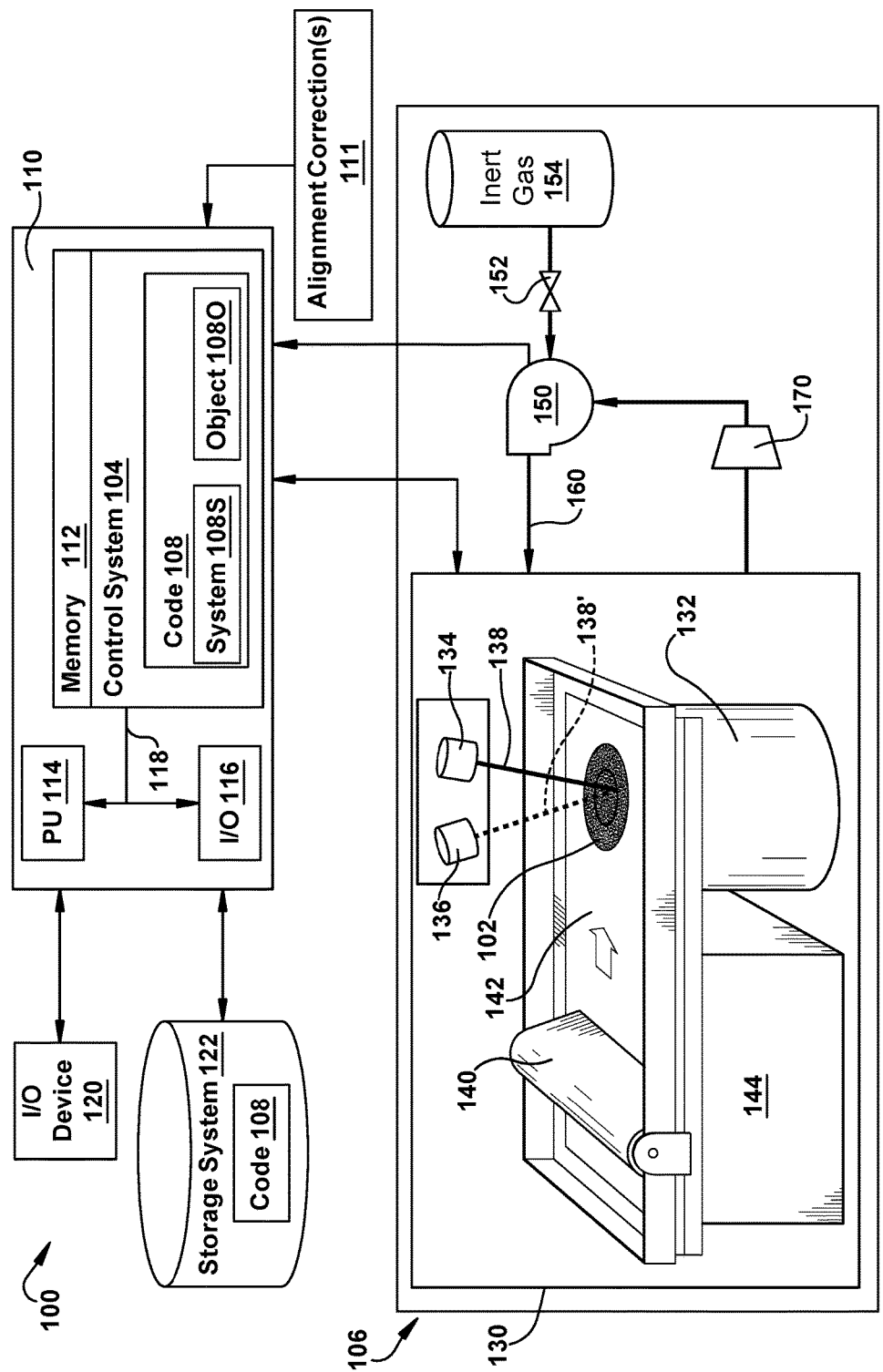
FIG. 4 shows a block diagram of an illustrative laser additive manufacturing system to which alignment correction(s) created according to embodiments of the disclosure can be applied.

FIG. 4 shows a schematic/block view of an illustrative computerized laser, metal powder additive manufacturing system 100 for generating an object 102, of which only an upper surface is shown. In this example, system 100 is arranged for direct metal laser melting (DMLM). It is understood that the general teachings of the disclosure are equally applicable to other forms of metal powder laser additive manufacturing such as selective laser melting (SLM). Object 102 is illustrated as a circular element; however, it is understood that the additive manufacturing process can be readily adapted to manufacture a large variety of parts.

System 100 generally includes a laser, metal powder additive manufacturing control system 104 ("control system") and an AM printer 106. As will be described, control system 104 executes code 108 to generate object 102 using multiple lasers 134, 136. Control system 104 is shown implemented on computer 110 as computer program code. To this extent, computer 110 is shown including a memory 112, a processor 114, an input/output (I/O) interface 116, and a bus 118. Further, computer 110 is shown in communication with an external I/O device/resource 120 and a storage system 122. In general, processor 114 executes computer program code 108 that is stored in memory 112 and/or storage system 112. While executing computer program code 108, processor 114 can read and/or write data to/from memory 112, storage system 122, I/O device 120 and/or AM printer 106. Bus 118 provides a communication link between each of the components in computer 110, and I/O device 120 can comprise any device that enables a user to interact with computer 110 (e.g., keyboard, pointing device, display, etc.). Computer 110 is only representative of various possible combinations of hardware and software. For example, processor 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of non-transitory computer readable storage medium including magnetic media, optical media, random access memory (RAM), read only memory (ROM), etc. Computer 110 can comprise any type of computing device such as an industrial controller, a network server, a desktop computer, a laptop, a handheld device, etc.

As noted, system 100 and in particular control system 104 executes code 108 to generate object 102. Code 108 can include, inter alia, a set of computer-executable instructions 108S for operating AM printer 106, and a set of computer-executable instructions 108O defining object 102 to be physically generated by AM printer 106. As described herein, additive manufacturing processes begin with a non-transitory computer readable storage medium (e.g., memory 112, storage system 122, etc.) storing code 108. Set of computer-executable instructions 108S for operating AM printer 106 may include any now known or later developed software code capable of operating AM printer 106. In addition, set of computer-executable instructions 108S may employ one or more alignment correction(s) 111, capable of correcting a position of lasers 134, 136 in an X and/or Y direction (see FIG. 6) to ensure alignment between lasers 134, 136.

Set of computer-executable instructions 108O defining object 102 may include a precisely defined 3D model of an object and can be generated from any of a large variety of well-known computer aided design (CAD) software systems such as AutoCAD®, TurboCAD®, DesignCAD 3D Max, etc. In this regard, code 108O can include any now known or later developed file format. Furthermore, code 108O representative of object 102 may be translated between different formats. For example, code 108O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 108O representative of object 102 may also be converted into a set of data signals and transmitted, received as a set of data signals and converted to code, stored, etc., as necessary. In any event, code 108O may be an input to system 100 and may come from a part designer, an intellectual property (IP) provider, a design company, the operator or owner of system 100, or from other sources. In any event, control system 104 executes code 108S and 108O, dividing object 102 into a series of thin slices that it assembles using AM printer 106 in successive layers of material.

Figure 1:
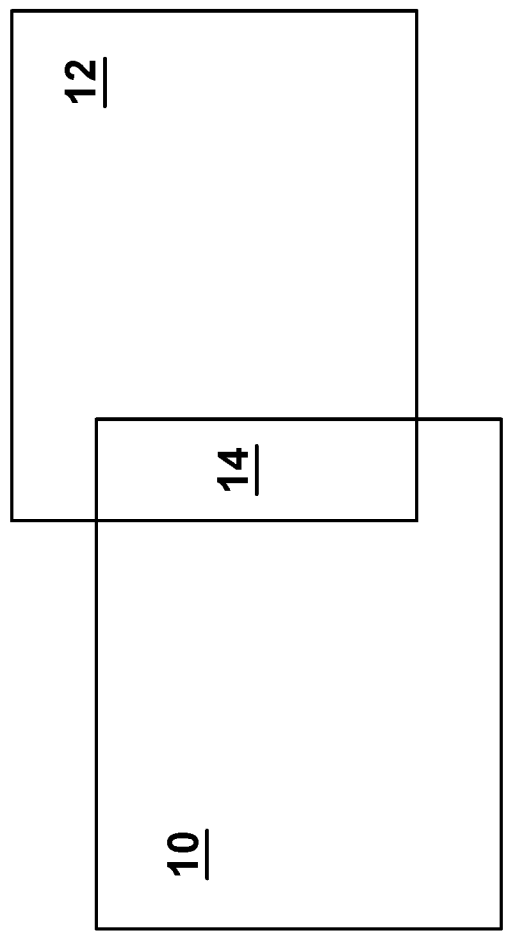
FIG. 1 shows a schematic plan view of fields of a pair of lasers from a laser additive manufacturing system and an overlap region thereof.
Figure 2:
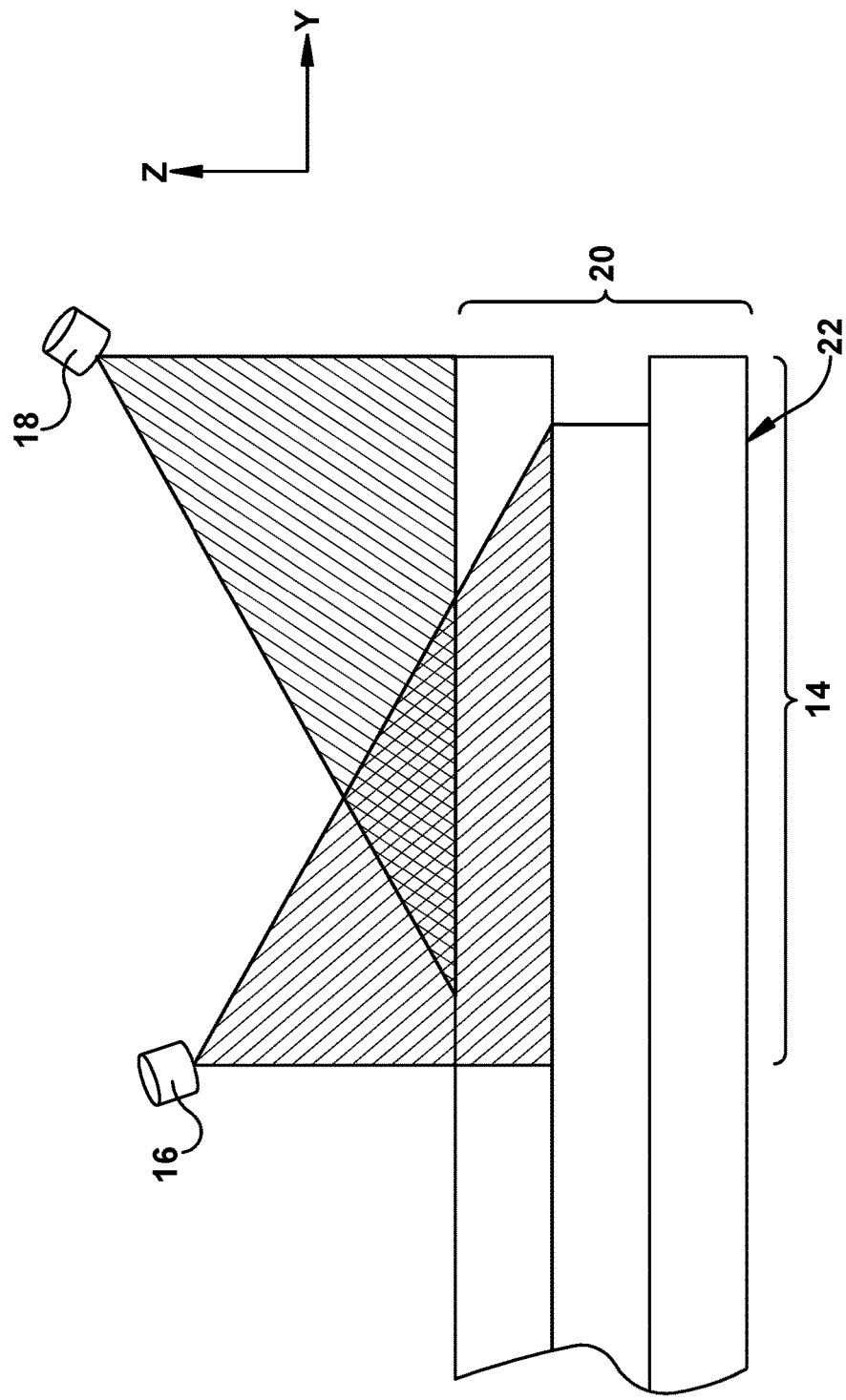
FIG. 2 shows an enlarged, schematic side view of layers of an object formed by a pair of unaligned lasers.
Figure 3:
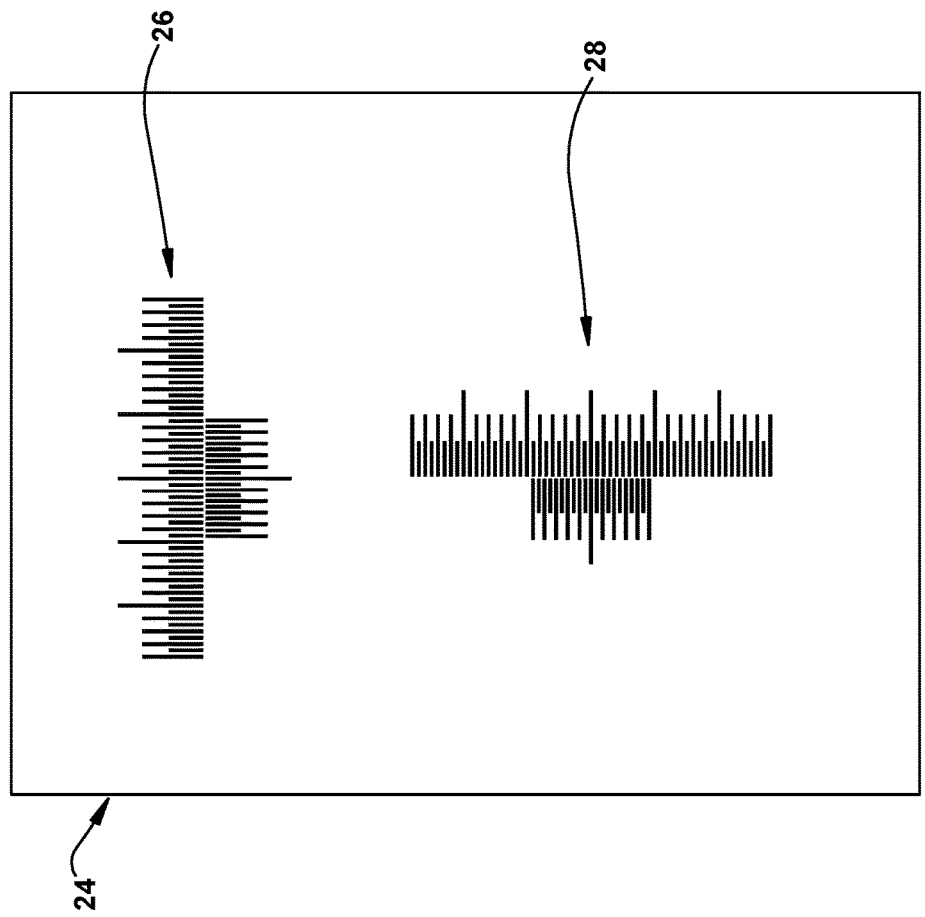
FIG. 3 shows a plan view of an alignment test foil used for a conventional alignment test for a pair of lasers.

AM printer 106 may include a processing chamber 130 that is sealed to provide a controlled atmosphere for object 102 printing. A metal powder bed or platform 132, upon which object 102 is built, is positioned within processing chamber 130. A number of lasers 134, 136 are configured to melt layers of metal powder on metal powder bed 132 to generate object 102. While a pair of lasers 134, 136 will be described herein, it is emphasized that the teachings of the disclosure are applicable to a system employing more than a pair of lasers 134, 136. Each laser 134, 136, as described relative to FIG. 1, has a field in which it can melt metal powder alone and an overlap region in which both lasers 134, 136 can melt metal powder. In this regard, each laser 134, 136 may generate a laser beams 138, 138', respectively, that fuses particles for each slice, as defined by code 108. Laser 134 is shown creating a layer of object 102 using laser beam 138, while laser 136 is shown dormant but with a phantom laser beam 138'. Each laser 134, 136 is calibrated in any now known or later developed manner. That is, each laser 134, 136 has had its laser beam's anticipated position relative to platform 132 correlated with its actual position in order to provide an individual position correction (not shown) to ensure its individual accuracy.

An applicator 140 may create a thin layer of raw material 142 spread out as the blank canvas from which each successive slice of the final object will be created. Various parts of AM printer 106 may move to accommodate the addition of each new layer, e.g., a metal powder bed 132 may lower and/or chamber 130 and/or applicator 140 may rise after each layer. The process may use different raw materials in the form of fine-grain metal powder, a stock of which may be held in a chamber 144 accessible by applicator 140. In the instant case, object 102 may be made of a "metal" which may include a pure metal or an alloy. In one example, the metal may include practically any non-reactive metal powder, i.e., non-explosive or non-conductive powder, such as but not limited to: a cobalt chromium molybdenum (Co-CrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc.

Processing chamber 130 is filled with an inert gas such as argon or nitrogen and controlled to minimize or eliminate oxygen. Control system 104 is configured to control a flow of a gas mixture 160 within processing chamber 130 from a source of inert gas 154. In this case, control system 104 may control a pump 150, and/or a flow valve system 152 for inert gas to control the content of gas mixture 160. Flow valve system 152 may include one or more computer controllable valves, flow sensors, temperature sensors, pressure sensors, etc., capable of precisely controlling flow of the particular gas. Pump 150 may be provided with our without valve system 152. Where pump 150 is omitted, inert gas may simply enter a conduit or manifold prior to introduction to processing chamber 130. Source of inert gas 154 may take the form of any conventional source for the material contained therein, e.g. a tank, reservoir or other source. Any sensors (not shown) required to measure gas mixture 160 may be provided. Gas mixture 160 may be filtered using a filter 170 in a conventional manner.

In operation, metal powder bed 132 is provided within processing chamber 130, and control system 104 controls flow of gas mixture 160 within processing chamber 130 from source of inert gas 154. Control system 104 also controls AM printer 106, and in particular, applicator 140 and lasers 134, 136 to sequentially melt layers of metal powder on metal powder bed 132 to generate object 102.

Figure 5:
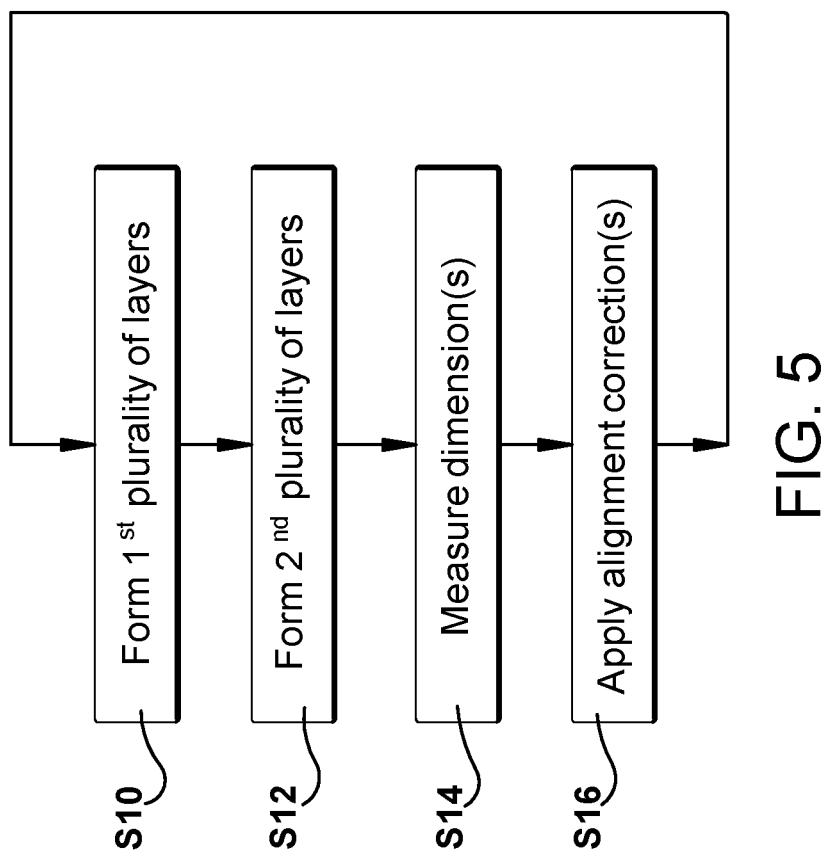
FIG. 5 shows a flow diagram of methods according to embodiments of the disclosure.
Figure 6:
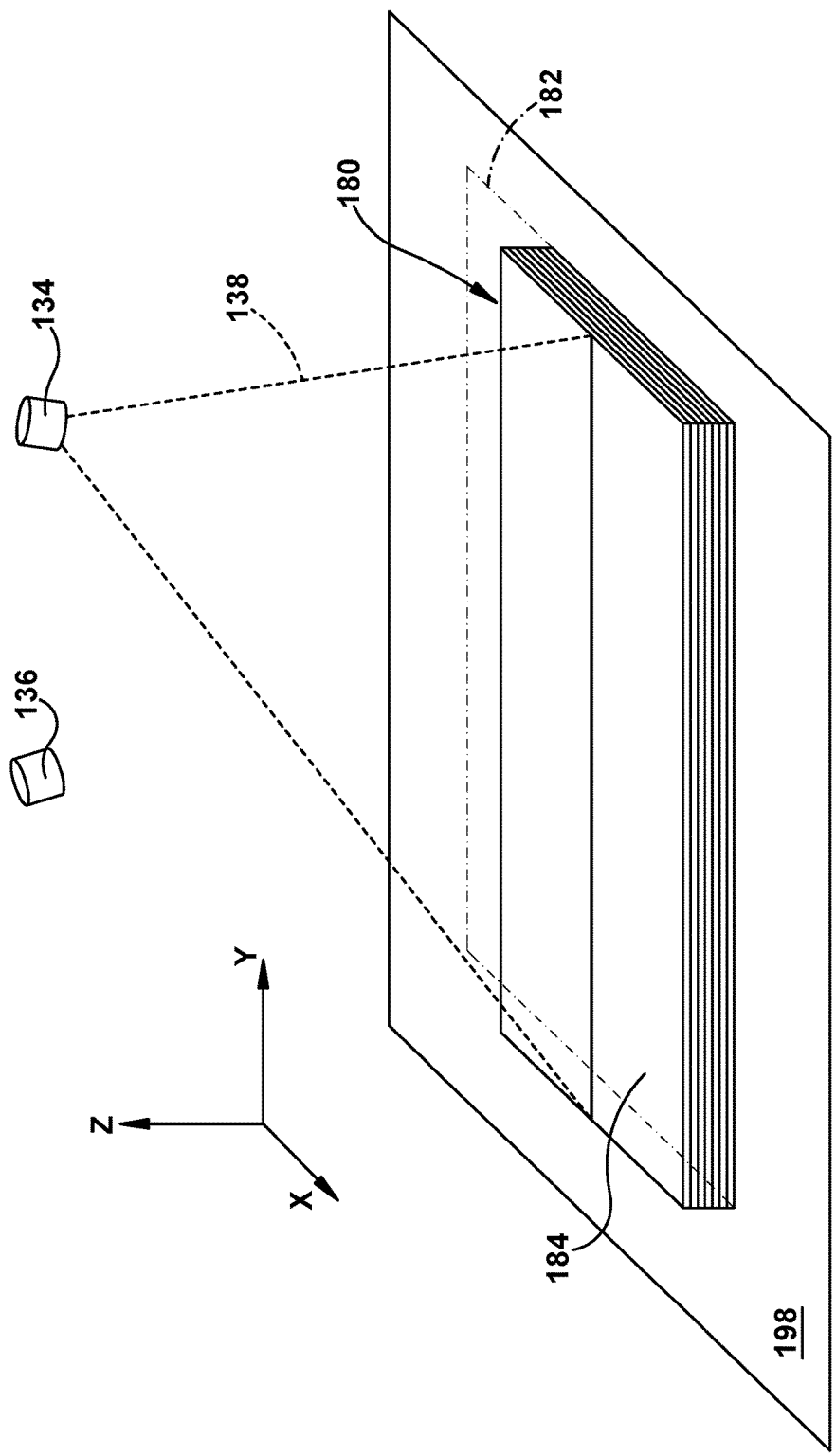
FIGS. 6-8 show perspective views of a test structure formed according to embodiments of methods of the disclosure.

Referring to FIGS. 5-10, embodiments of a method for aligning pair of calibrated lasers 134, 136 of laser additive manufacturing system 100 in an overlap region 182 (FIG. 6)

in which the pair of calibrated lasers selectively operate, will now be described. According to embodiments of the disclosure, object 102 is formed as a test structure 180 exclusively within overlap region 182 such that test structure 180 can be used to determine misalignment of calibrated lasers 134, 136. Test structure 180 can be made of any of the aforementioned materials and is ideally formed with operational parameters substantially equivalent to normal object 102 formation.

With first reference to the flow diagram of FIG. 5 in conjunction with the perspective view of FIG. 6, embodiments of the method may include, S10, forming a first plurality of layers 184 of (partially completed) test structure 180 in overlap region 182 of pair of calibrated lasers 134, 136 solely using a first calibrated laser 134 of pair of calibrated lasers 134, 136. A second calibrated laser 136 is dormant during this process. Laser beam 138 of calibrated laser 134 and an anticipated overlap region 182 are shown in phantom in FIG. 6. In one embodiment, calibrated laser 134 is operated employing a laser power substantially equal to a laser power at which calibrated laser 134 operates to create object 102 using the laser additive manufacturing system 100. The actual laser power employed may vary depending on a number of factors such as but not limited to the metal powder used (e.g., Inconel would be different than CoCr) and object 102 being formed. In any event, calibrated laser 134 and the rest of AM printer 106 are operated at as close to normal operating conditions as possible for the material and/or object for which alignment of calibrated lasers 134, 136 is sought.

Figure 7:
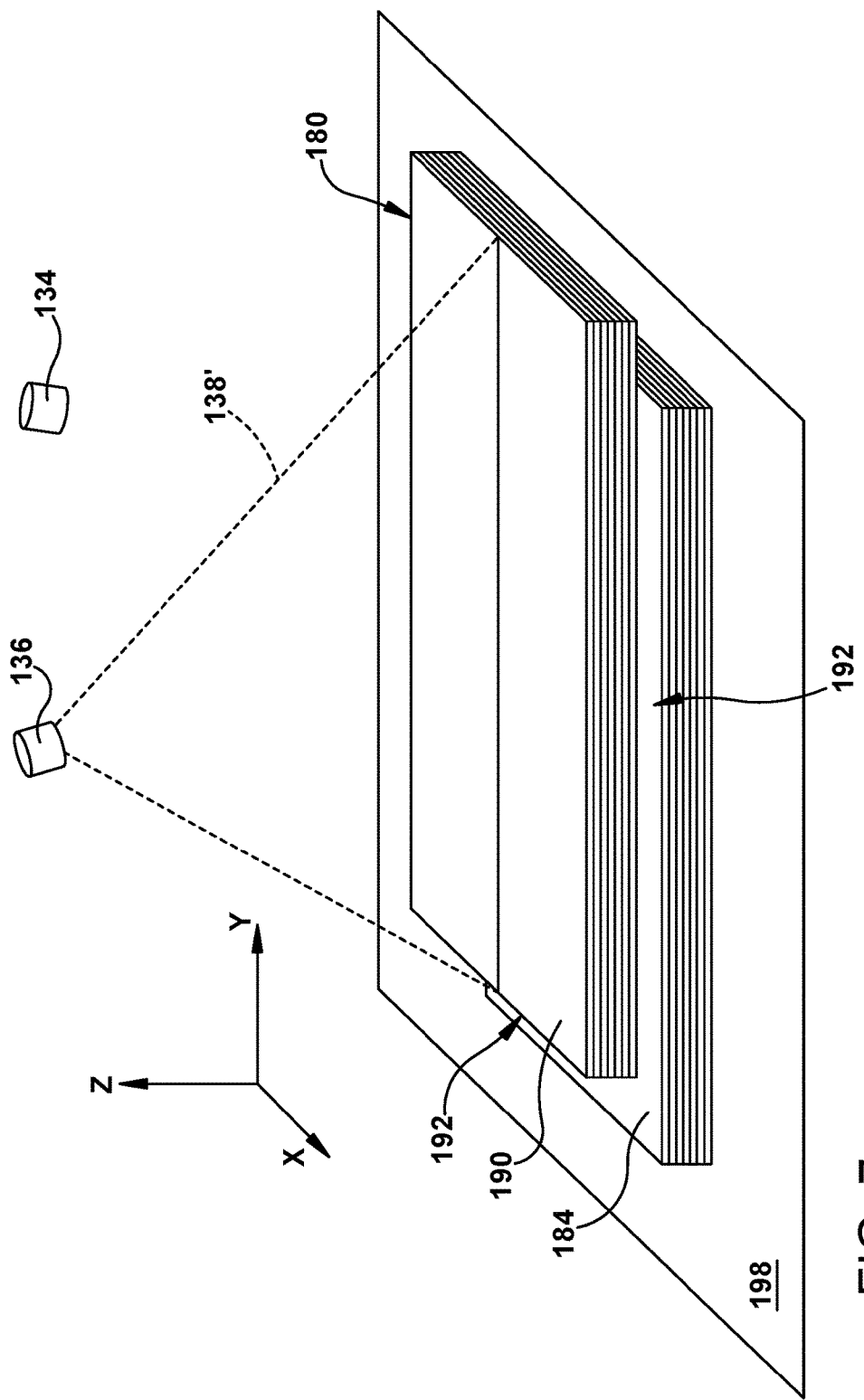

Referring to FIGS. 5 and 7, in S12, a second plurality of layers 190 of test structure 180 are formed in overlap region 182 (now hidden in FIG. 7, see FIG. 6) of pair of calibrated lasers 134, 136 solely using a second calibrated laser 136 of pair of calibrated lasers 134, 136. That is, second plurality of layers 190 are formed atop first plurality of layers 184 to form test structure 180. First calibrated laser 134 is dormant during this process. As shown in FIG. 7, the forming steps, S10 and S12, create an outer surface 192 of test structure 180 corresponding to overlap region 182 (FIG. 6). Laser beam 138' of calibrated laser 136 is shown in phantom in FIG. 7. Second calibrated laser 136 is operated employing a laser power substantially equal to a laser power at which calibrated laser 136 operates to create object 102 using the laser additive manufacturing system 100. That is, second calibrated laser 136 is operated at the same conditions as first calibrated laser 134 during forming of plurality of layers 184. As noted, the actual laser power employed may vary depending on a number of factors.

As shown in FIGS. 6-9, in one embodiment, the forming steps may include forming test structure 180 on a member 198 that is removable from laser additive manufacturing system 100. Member 198 may include any structure capable of providing a foundation for test structure 180, e.g., a metal plate.

Figure 8:
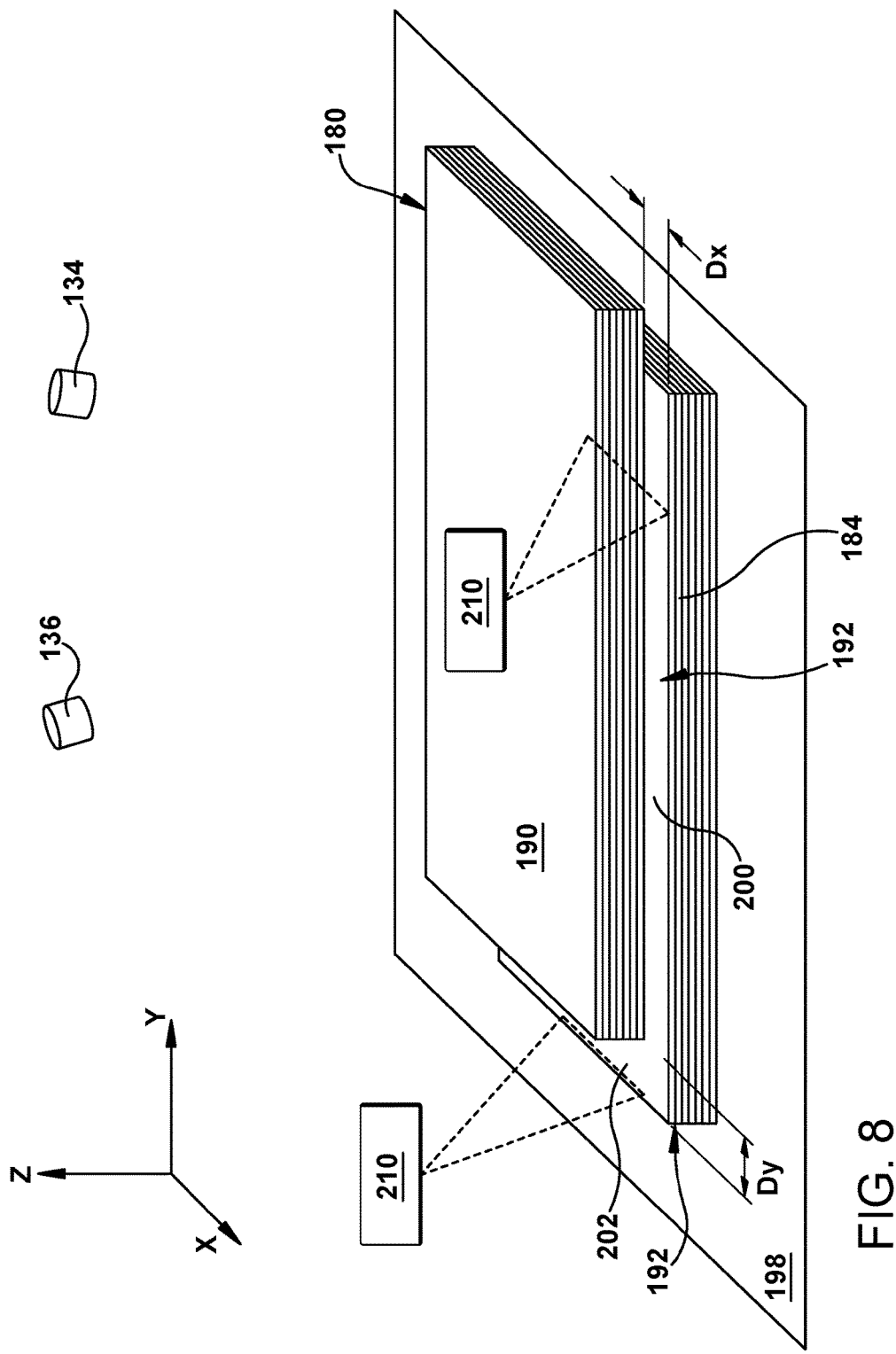

Referring to FIGS. 5 and 8, in S14, a dimension (Dx and/or Dy) of an offset step 200 and/or 202 created between first plurality of layers 184 and second plurality of layers 190 in outer surface 192 of test structure 180 is/are measured. As illustrated, calibrated lasers 134, 136 may be misaligned in the X-direction and the Y-direction. It is emphasized, however, that calibrated lasers 134, 136 may be misaligned in only one direction, X or Y, or may be aligned. The measuring may be conducted using any now known or later developed measurement system 210. In one embodiment, measurement system 210 may include a coordinate measuring machine to scan outer surface 192 of test structure 180. In another embodiment, the coordinate measuring machine may include a laser configured to scan outer surface 192 of test structure 180 to obtain the dimension(s). While FIG. 8 shows a scan as if a light source, measurement system 210 could employ any measurement technique including mechanical probes, etc. The dimension(s) Dx, Dy may be measured in any desired units, e.g., micrometers, millimeters, etc. Where calibrated lasers 134, 136 are misaligned in both X and Y directions or the misalignment is unknown and the user wants measurement system 210 to determine the existence of the misalignment, measurement system 210 may measure an X-direction dimension Dx of an X-direction offset step 200 created between first plurality of layers 184 and second plurality of lasers 190 in outer surface 192 of test structure 180. And, measurement system 210 may measure a Y-direction dimension Dy of an Y-direction offset step 202 created between first plurality of layers 184 and second plurality of layers 190 in outer surface 192 of test structure 180. Alternatively, where the misalignment direction is known or only one misalignment direction is of concern, measurement system 210 may simply measure one dimension Dx or Dy.

Figure 9:
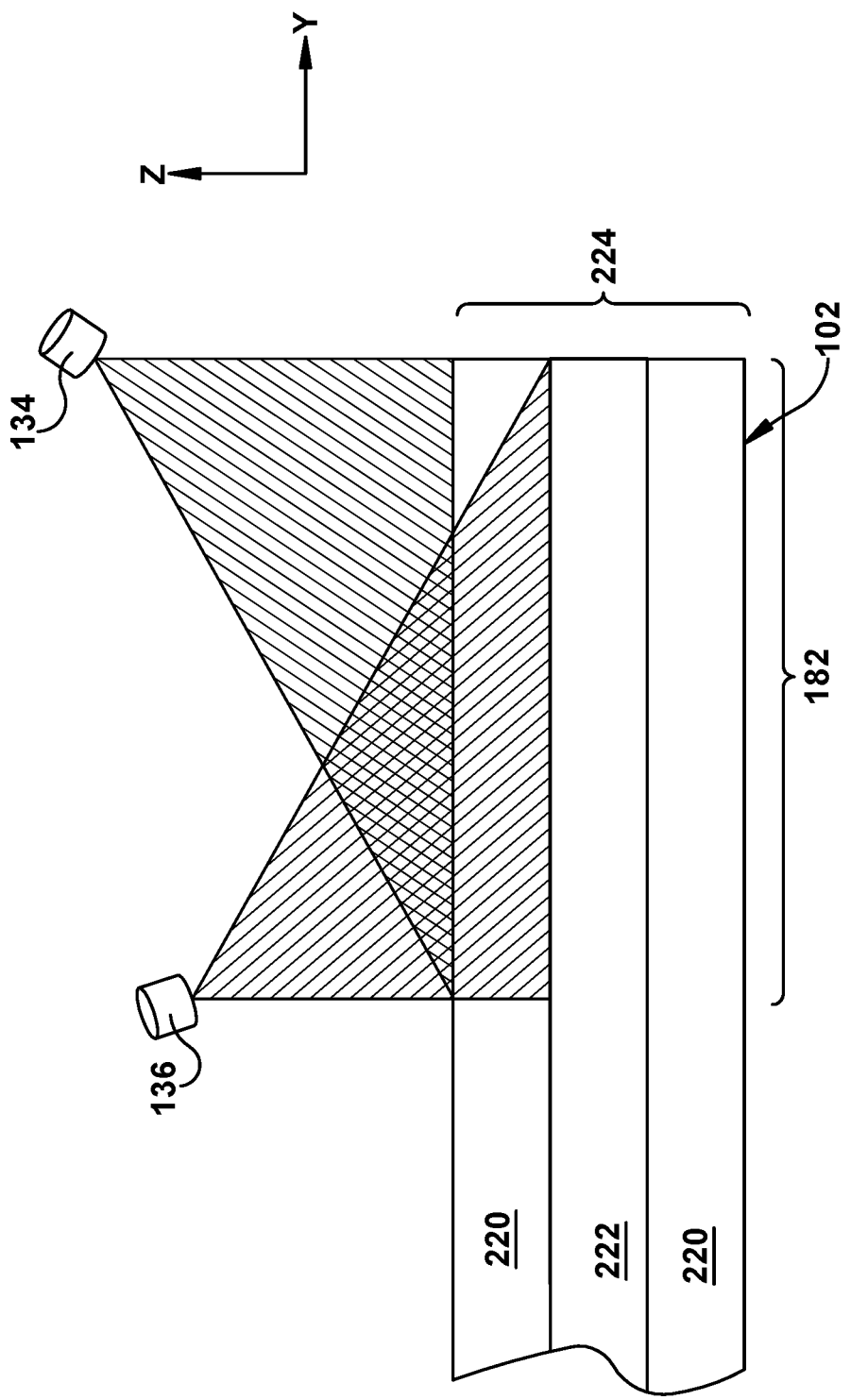
FIG. 9 shows an enlarged, schematic side view of layers of an object formed by a pair of lasers aligned according to embodiments of the disclosure.
Figure 10:
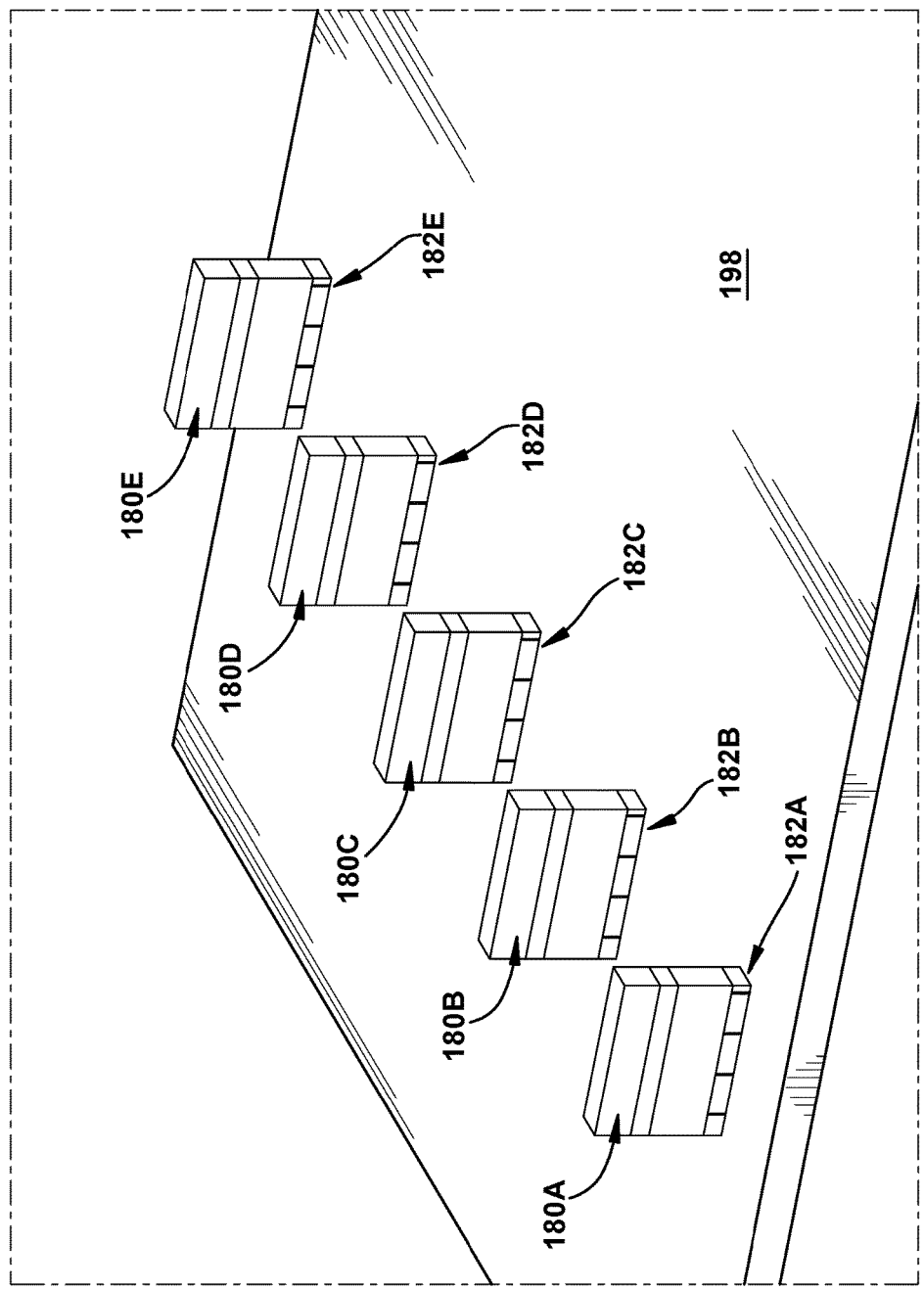
FIG. 10 shows a perspective view of a plurality of test structures formed according to embodiments of methods of the disclosure.

In S16 in FIG. 5, pair of calibrated lasers 134, 136 are aligned by applying the dimension (Dx and/or Dy) of the offset step as an alignment correction 111 (FIG. 4) to at least one of pair of calibrated lasers 134, 136. Alignment correction(s) 111 would be employed in a conventional fashion by control system 104 to control AM printer 106 and, in particular, calibrated lasers 134, 136. For example, an X-direction misalignment (Dx) of 0.1 millimeters, would be used to adjust calibrated laser(s) 134, 136 0.1 mm in the X-direction in such a way to remove the misalignment. In this fashion, as shown in FIG. 9, layer(s) 220 formed by calibrated laser 134 and then layer(s) 222 subsequently formed by calibrated laser 136, during formation of an object 102, are aligned within overlap region 182, resulting in a smooth outer surface 224 of object 102. In one embodiment, both calibrated lasers 134, 136 may be adjusted using alignment correction(s) 111; however, ideally, only a selected one of pair of calibrated lasers 134, 136 is adjusted. It is emphasized that one or more alignment corrections 111 aligning the pair of calibrated lasers may be provided. For example, in terms of 2 corrections being applied, X-direction dimension Dx of X-direction offset step 200 may be applied as a first alignment correction 111 (FIG. 4) to a selected one of pair of calibrated lasers 134, 136 for a given overlap region 182, and Y-direction dimension Dy of Y-direction offset step 202 may be applied as a second alignment correction 111 (FIG. 4) to the same selected one of pair of calibrated lasers 134, 136 for the same overlap region 182.

In some laser additive manufacturing systems 100, more than one overlap region 182 (FIG. 6) may exist, i.e., across metal powder bed 142 (FIG. 4). In an alternative embodiment, shown in FIGS. 5 and 10, steps S10-16 may be repeated for each of a plurality of test structures 180A-E (five shown, but could be more or less) corresponding to a plurality of overlap regions 182A-E (under test structures 180A-E, respectively) of laser additive manufacturing system 100. That is, each overlap region 182A-E may have a corresponding alignment correction(s) 111 (FIG. 4), e.g., X-direction and/or Y-direction. In one embodiment, a standard deviation of less than a predetermined threshold, e.g., 30 micrometers, across test structures 180A-E is sought to ensure accuracy for all objects created using system 100. If a standard deviation within the predetermined threshold cannot be obtained, it is an indication to a user that other calibration processes, other than alignment, may be required.

This methods of the disclosure provide techniques for isolating multiple calibrated lasers in laser additive manufacturing system 100 for measuring the relative X and Y direction misalignment from each other so that the multiple lasers can be used to seamlessly build a single large object without any indications of multiple lasers being present. Consequently, the disclosure allows for building larger more complex laser based additive objects, e.g., using two or more lasers. While the teachings of the disclosure have been applied to a pair of calibrated lasers 134, 136, it is emphasized that the teachings can be extended to systems employing more than two lasers.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for aligning a pair of calibrated lasers of a laser additive manufacturing system in an overlap region in which the pair of calibrated lasers selectively operate, the method comprising:
   first forming a first plurality of layers of a test structure in the overlap region of the pair of calibrated lasers solely using a first calibrated laser of the pair of calibrated lasers;
   second forming a second plurality of layers of the test structure over the first plurality of layers in the overlap region of the pair of calibrated lasers solely using a second calibrated laser of the pair of calibrated lasers, the first and second forming creating a top surface of the test structure, and an outer surface of the test structure corresponding to the overlap region, the outer surface being perpendicular to the top surface;
   measuring a dimension of an offset step created between the first plurality of layers and the second plurality of layers in the outer surface of the test structure; and
   aligning the pair of calibrated lasers by applying the dimension of the offset step as an alignment correction to at least one of the pair of calibrated lasers.

2. The method of claim 1, wherein the measuring includes using a coordinate measuring machine to scan the outer surface of the test structure.

3. The method of claim 2, wherein the coordinate measuring machine includes a laser configured to scan the outer surface of the test structure.

4. The method of claim 1, wherein the first and second forming include employing a laser power for each of the first and second calibrated lasers substantially equal to a laser power at which each calibrated laser operates to create an object using the laser additive manufacturing system.

5. The method of claim 1, wherein the measuring and aligning include:
   measuring an X-direction dimension of an X-direction offset step created between the first plurality of layers and the second plurality of layers in the outer surface of the test structure;
   measuring a Y-direction dimension of an Y-direction offset step created between the first plurality of layers and the second plurality of layers in the outer surface of the test structure; and
   aligning the pair of calibrated lasers by applying the X-direction dimension of the X-direction offset step as a first alignment correction to one of the pair of calibrated lasers and applying the Y-direction dimension of the Y-direction offset step as a second alignment correction to one of the pair of calibrated lasers.

6. The method of claim 1, further comprising repeating the first forming, the second forming, the measuring and the aligning for each of a plurality of test structures corresponding to a plurality of overlap regions of the laser additive manufacturing system.

7. The method of claim 1, wherein the applying the dimension of the offset step as the alignment correction includes applying the dimension of the offset step as the alignment correction to a selected one of the pair of calibrated lasers.

8. The method of claim 1, wherein the first and second forming include forming the test structure on a member removable from the laser additive manufacturing system.

9. A method for aligning a pair of calibrated lasers of a laser additive manufacturing system in an overlap region in which the pair of calibrated lasers selectively operate, the method comprising:
   first forming a first plurality of layers of a test structure in the overlap region of the pair of calibrated lasers solely using a first calibrated laser of the pair of calibrated lasers;
   second forming a second plurality of layers of the test structure over the first plurality of layers in the overlap region of the pair of calibrated lasers solely using a second calibrated laser of the pair of calibrated lasers, the first and second forming creating a top surface of the test structure, and an outer surface of the test structure corresponding to the overlap region,
   wherein the outer surface being perpendicular to the top surface, and wherein the first and second forming include employing a laser power for each of the first and second calibrated lasers substantially equal to a laser power at which each calibrated laser operates to create an object using the laser additive manufacturing system;

measuring a dimension of an offset step created between the first plurality of layers and the second plurality of layers in the outer surface of the test structure; and aligning the pair of calibrated lasers by applying the dimension of the offset step as an alignment correction to a selected one of the pair of calibrated lasers.

10. The method of claim 9, wherein the measuring includes using a coordinate measuring machine to scan the outer surface of the test structure.

11. The method of claim 10, wherein the coordinate measuring machine includes a laser configured to scan the outer surface of the test structure.

12. The method of claim 9, wherein the measuring and aligning include:

measuring an X-direction dimension of an X-direction offset step created between the first plurality of layers and the second plurality of layers in the outer surface of the test structure;

measuring a Y-direction dimension of an Y-direction offset step created between the first plurality of layers and the second plurality of layers in the outer surface of the test structure; and aligning the pair of calibrated lasers by applying the X-direction dimension of the X-direction offset step as a first alignment correction to a selected one of the pair of calibrated lasers and applying the Y-direction dimension of the Y-direction offset step as a second alignment correction to the selected one of the pair of calibrated lasers.

13. The method of claim 9, further comprising repeating the first forming, the second forming, the measuring and the aligning for each of a plurality of test structures corresponding to a plurality of overlap regions of the laser additive manufacturing system.

14. The method of claim 9, wherein the applying the dimension of the offset step as the alignment correction includes applying the dimension of the offset step as the alignment correction to only one of the pair of calibrated lasers.

15. The method of claim 9, wherein the first and second forming include forming the test structure on a member removable from the laser additive manufacturing system.

16. A method for aligning a pair of calibrated lasers of a laser additive manufacturing system in an overlap region in which the pair of calibrated lasers selectively operate, the method comprising:

first forming a first plurality of layers of a test structure in the overlap region of the pair of calibrated lasers solely using a first calibrated laser of the pair of calibrated lasers;

second forming a second plurality of layers of the test structure over the first plurality of layers in the overlap region of the pair of calibrated lasers solely using a second calibrated laser of the pair of calibrated lasers, the first and second forming creating a top surface of the test structure, and an outer surface of the test structure corresponding to the overlap region, wherein the outer surface is perpendicular to the top surface in a Z-direction dimension, and wherein the first and second forming include employing a laser power for each of the first and second calibrated lasers substantially equal to a laser power at which each calibrated laser operates to create an object using the laser additive manufacturing system;

measuring an X-direction dimension of an X-direction offset step created between the first plurality of layers and the second plurality of layers in the outer surface of the test structure;

measuring a Y-direction dimension of an Y-direction offset step created between the first plurality of layers and the second plurality of layers in the outer surface of the test structure; and aligning the pair of calibrated lasers by applying the X-direction dimension of the X-direction offset step as a first alignment correction to a selected one of the pair of calibrated lasers and applying the Y-direction dimension of the Y-direction offset step as a second alignment correction to the selected one of the pair of calibrated lasers.

17. The method of claim 16, wherein the measuring of the X-direction and the Y-direction dimension includes using a coordinate measuring machine to scan the outer surface of the test structure.

18. The method of claim 17, wherein the coordinate measuring machine includes a laser configured to scan the outer surface of the test structure.

19. The method of claim 16, further comprising repeating the first forming, the second forming, the measuring of the X-direction dimension, the measuring of the Y-direction dimension and the aligning for each of a plurality of test structures corresponding to a plurality of overlap regions of the laser additive manufacturing system.

20. The method of claim 16, wherein the first and second forming include forming the test structure on a member removable from the laser additive manufacturing system.

* * * * *